July 27, 1965 W. T. WYNNE 3,197,622

ANALOG DIGITAL DATA SYSTEM

Filed Feb. 23, 1962 6 Sheets-Sheet 1

July 27, 1965 W. T. WYNNE 3,197,622

ANALOG DIGITAL DATA SYSTEM

Filed Feb. 23, 1962 6 Sheets-Sheet 6

3,197,622

ANALOG DIGITAL DATA SYSTEM

William T. Wynne, Willow Grove, Pa., assignor to Leeds and Northrup Company, Philadelphia, Pa., a corporation of Pennsylvania Filed Feb. 23, 1962, Ser. No. 174,942
7 Claims. (Cl. 235—154)

This invention relates to analog-digital arithmetic systems for producing a binary-coded decimal output representative of the average of a predetermined number of analog values, each representative for example of the output of a transducer responsive to the magnitude of a condition such as temperature, pressure, rate of flow, electrical generation or other process variable.

In accordance with the invention, each of successive analog values is effectively divided by two factors whose product equals the predetermined number of analog values whose average is to be ascertained. Specifically, each analog value is first divided by one of said factors by appropriately setting the gain of a scaling amplifier whose output is converted to binary-coded form. A second division, by the other of said factors, is effected by setting the once divided instantaneous value as converted to binary-coded form in a register in displaced position, the extent of displacement corresponding with the order of the second factor: more specifically, when the amplifier output is in binary-coded decimal form, its displacement in the register corresponds with a division by 10 per stage. Each of such twice divided instantaneous values as set in the register is combined with the accumulation of such previously divided values until the predetermined number thereof has been reached, at which time the register contents correspond with the average of the instantaneous values. When the actual instantaneous analog value is to be ascertained, the amplifier gain is set to unity and there is no displacement of the amplifier output as set into the register. Both the actual instantaneous analog value and the average analog value appear on the same output lines of the register although, of course, at different times.

Further in accordance with the invention, an analog-to-digital converter interposed between the scaling amplifier and the register converts the analog input of the converter into sequentially-produced groups of pulses, the number of the pulse groups corresponding with the number of significant figures in the maximum analog value and the number of pulses per group corresponding with the decimal value of the corresponding digit of the actual analog value.

Further in accordance with the invention, the binary-coded counter stages of the register each includes a counter-advance module comprising three input And gates and a differentiator for producing a delayed output of an associated amplifier. This module as used in a counter stage having shift-steering lines has an additional input line which inhibits the module from producing an output while the shift-steering lines are enabled so to prevent a false count in the stage.

The invention further resides in an analog-digital arithmetic system and components thereof having features of novelty and utility hereinafter described and claimed.

For a more detailed understanding of the invention, reference is made to the following detailed description and to the associated drawings in which:

FIGS. 1A, 1B jointly disclose in schematic form a complete system embodying the invention;

Figure 1A:
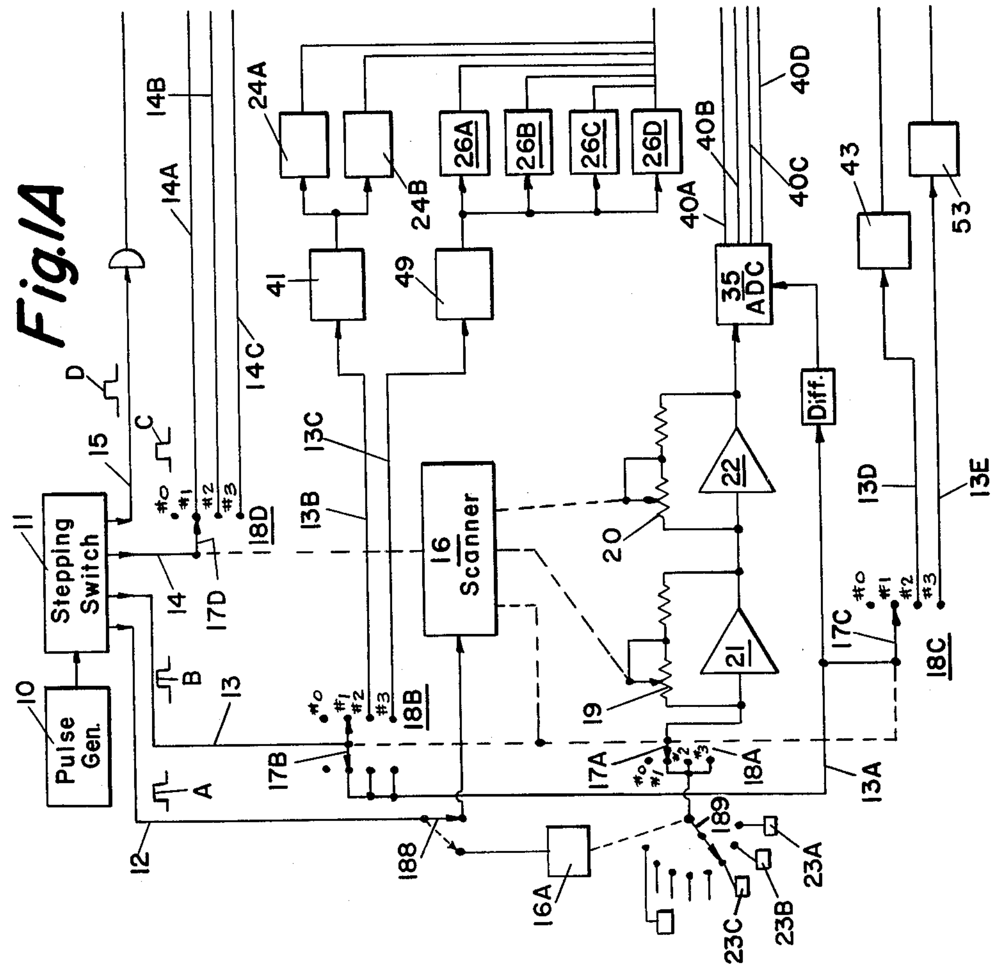
FIG. 1C is an explanatory figure more fully showing scanning switches of the systems of FIGS. 1A, 1B, and FIG. 2.
Figure 1C:
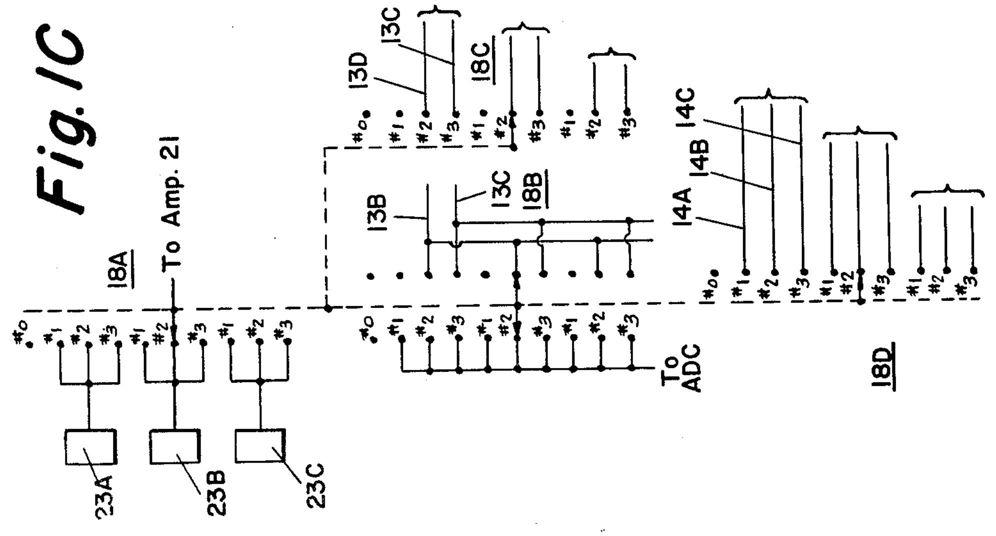
Figure 1B:
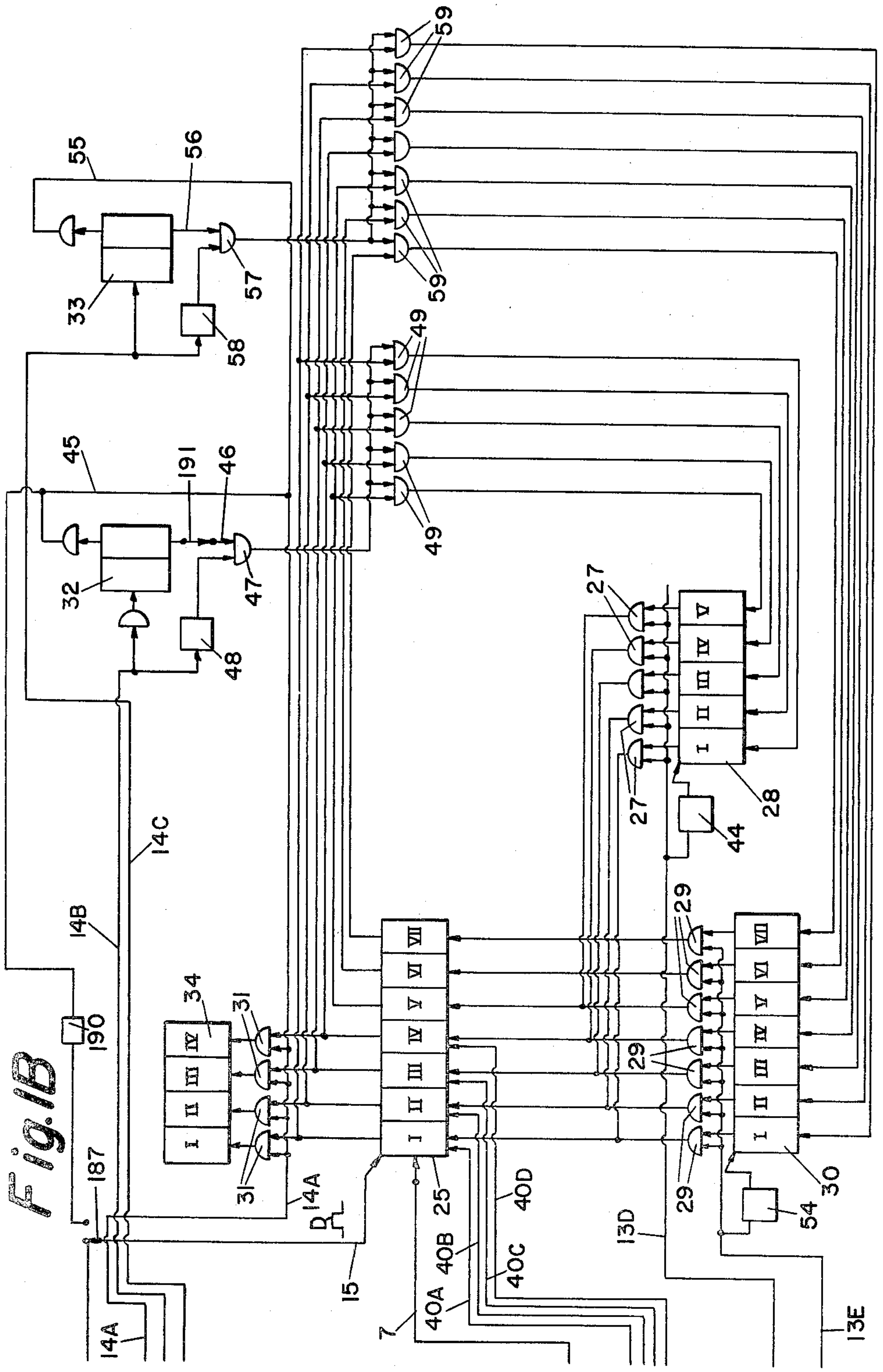
Figure 2:
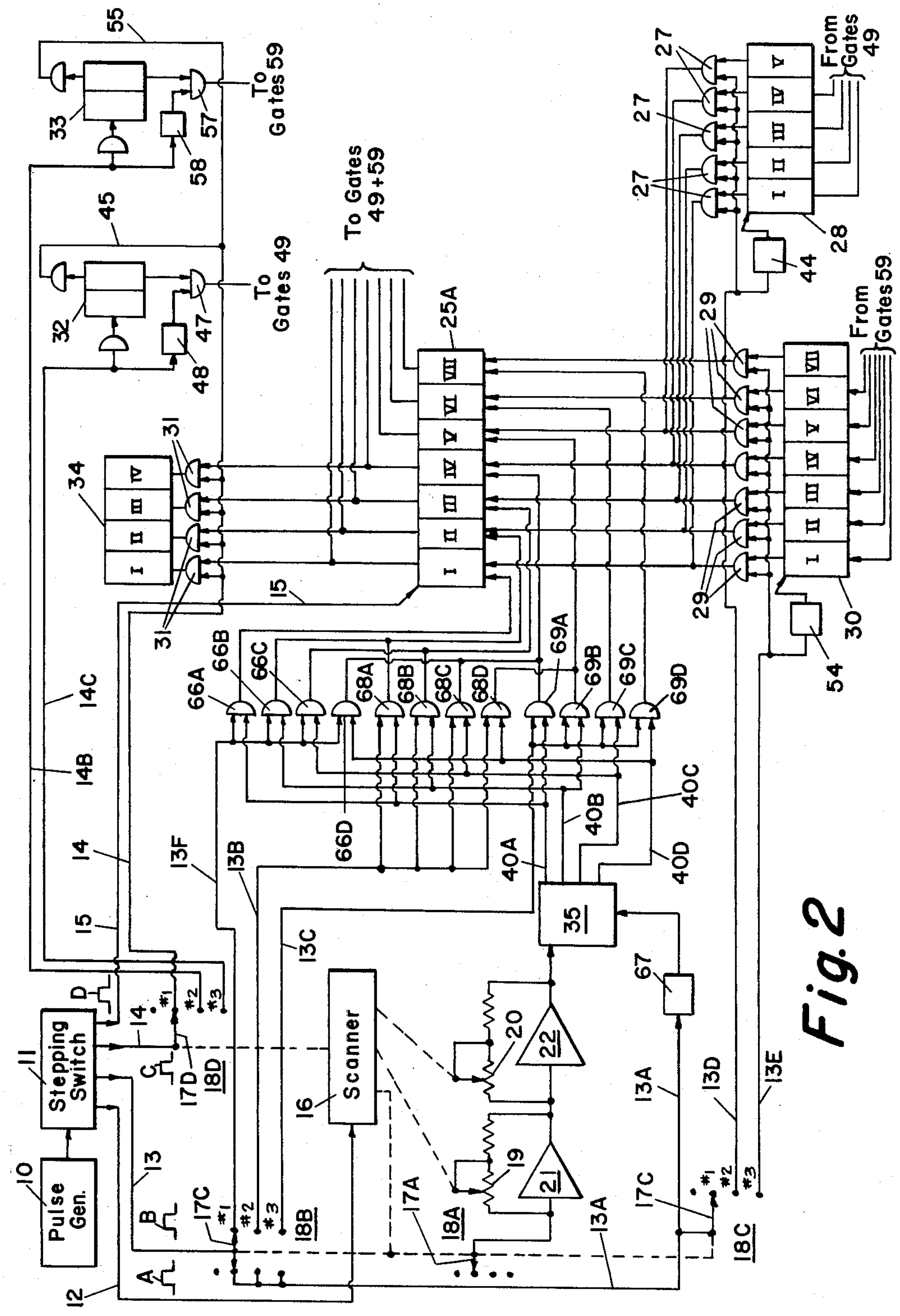
FIG. 2 is a modification of the system of FIGS. 1A, 1B.
Figure 5:
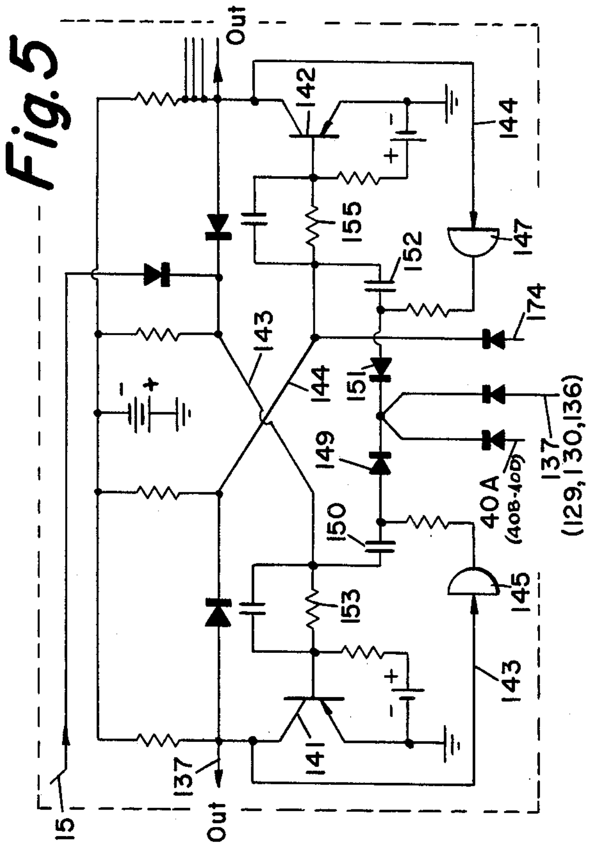
Figure 6:
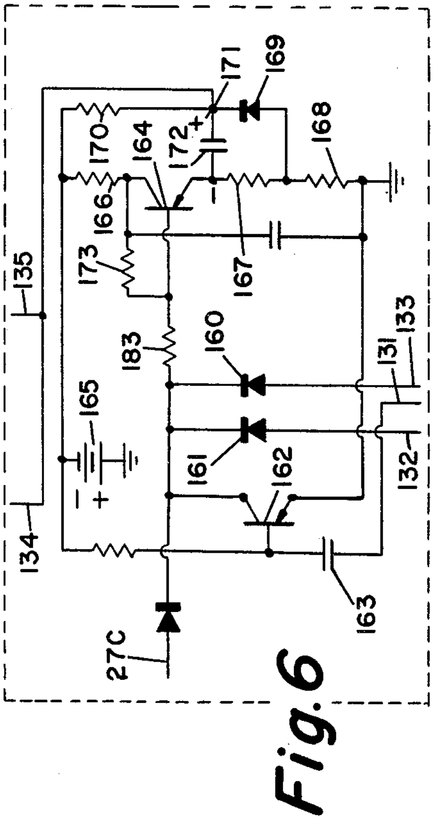
Figure 4:
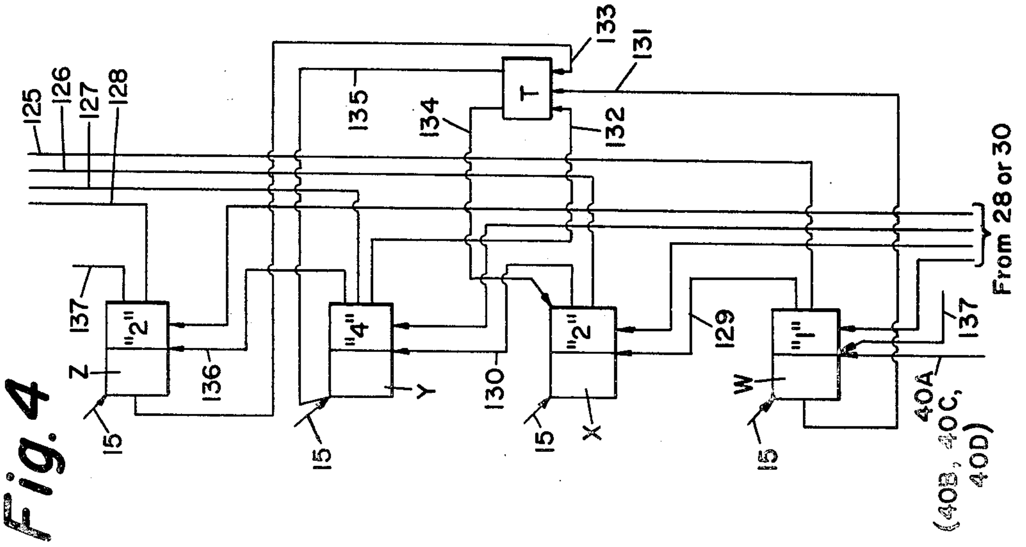
Figure 7:
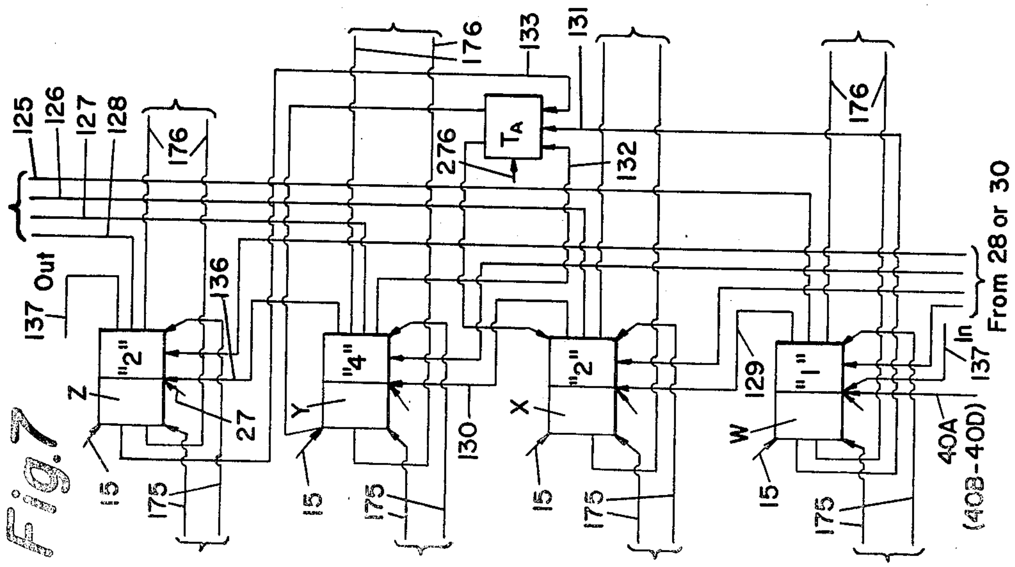

FIG. 4 discloses the internal circuitry of one of the register stages of FIG. 2;

FIG. 5 is a circuit diagram of one of the counter-stage modules of FIG. 4;

FIG. 6 is a circuit diagram of the counter-advance modules of FIGS. 4 and 7;

FIG. 7 discloses the components of one stage of the register of FIG. 1B; and

Figure 8:
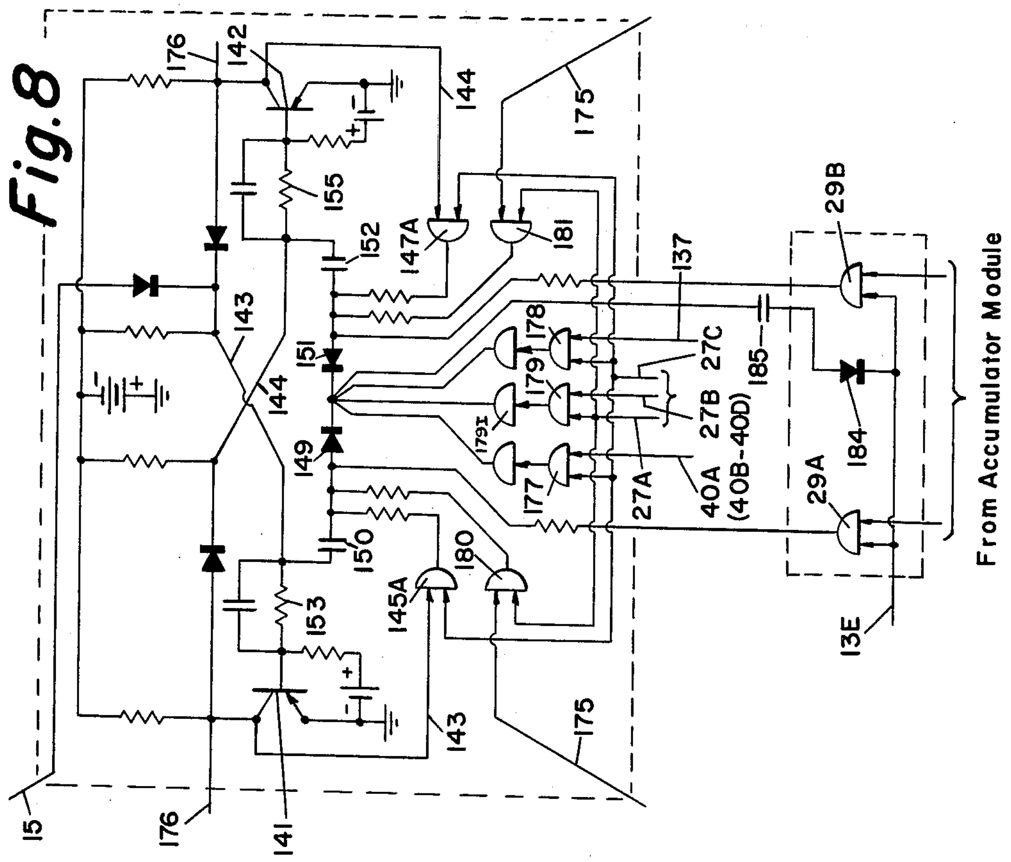

FIG. 8 is a circuit diagram of a common module of FIG. 7.

Referring to FIG. 1A, the pulse generator 10, which may be of any suitable type such as a free-running multivibrator, continuously produces timed pulses which are applied to the ring counter 11 or equivalent stepping switch. For each of its cycles, the stepping switch produces in succession four signals A–D respectively appearing on its output lines 12 to 15.

The first of these signals, signal A, is applied over line 12 to the control device or scanner 16 to advance by one step the position of the movable contacts 17A–17D of the four scan switches 18A–18D and also to set the gain-control resistance means 19, 20 of the amplifiers 21, 22. The gain-control feedback resistors 19, 20 may be set, as by dials, to predetermined values, or each may comprise a series of binary-coded resistors selectively included in circuit by a plurality of relays preset for a predetermined pattern of operation by scanner 16. The amplifiers 21, 22, as later explained, are provided to amplify to predetermined extent the output signals of condition-responsive devices or transducers 23A et seq. (FIG. 1C) successively connected thereto by scan switch 18A in each cycle of scanner 16, each after a predetermined number of cycles of the stepping switch 11.

The second signal, signal B, produced by stepping switch 11 in each of its cycles is applied, except for the #0 or homing position of the scan switches, over lines 13 and 13A as a Start signal for the analog-to-digital converter 35 (hereinafter referred to as ADC). It is also applied over line 13B for every #2 position of scan switch 18B to the one-shot multivibrator circuits 24A, 24B to effect a predetermined shift of the digits then temporarily stored in the counter register 25 (FIG. 1B). For every #3 position of scan switch 18B, signal B is applied over line 13C to the flip-flop circuits 26A–26C to effect a different predetermined shift of the digits then temporarily stored in the counter register 25. For every #2 position of scan switch 18C, signal B is applied over line 13D to the output gates 27 (FIG. 1B) of accumulator 28 which may, as shown, be of the register type or may be of the core memory type or of the magnetic drum type. For every #3 position of scan switch 18C, signal B is applied over line 13E to the output gates 29 of a second accumulator 30 of type similar to accumulator 28. The third signal, signal C, produced by stepping switch 11 during each of its cycles, is applied over line 14A for every #1 position of the scan switch 18D to the input gates 31 of a read-out device 34 (FIG. 1B). For every #2 position of scan switch 18D, the signal C is applied over line 14B as an input pulse to the pulse counter 32. For every #3 position of scan switch 18D, the signal C is applied over line 14C as an input pulse to the pulse counter 33.

The fourth signal, signal D, produced by stepping switch 11 during each of its cycles, is applied over line 15 as a Reset signal for the register 25.

For purpose of explanation of operation of the system of FIGS. 1A, 1B, it will be assumed that it is desired to read out the existing output of a transducer 23A at one minute intervals, to read out the average of such output at hourly intervals, and to read out the average of such output for the preceding twenty-four-hour interval. In such case, the repetition frequency of the pulse generator is preselected, by design or adjustment, so that once per minute the switches 18A–18D scan the #1 to #3 positions related to transducer 23A: the counter 32 is preselected, by design or adjustment, to produce one output pulse per 60 input signals C: and counter 33 is preselected, by design or adjustment, to produce one output pulse per 1440 input signals C.

With the scan switches in their #1 positions as advanced thereto by a signal A for direct read-out of the existing output of transducer 23A, the gain of the amplifier 22 has been set by the scanner 16 to unity so that the analog input of converter 35 corresponds with the output of transducer 23A as amplified by amplifier 21. For utilization of the maximum capabilities of the system and for working with signal levels above the inherent noise of converter 35, the gain of amplifier 21 is preset so that for maximum output of the transducer within its working range, the corresponding value stored in the register 25 will be nearly the register maximum, i.e., 9999.

To give a specific example, it will be assumed that the transducer output is 7.359 millivolts (within its range of 0 to 9.999 millivolts). With the gain of amplifier 21 being set at 1,000 and the gain of amplifier 22 set at unity, the analog input to the converter 25 is 7.359 volts. During the ensuing cycle of the converter as initiated by a B signal, such analog input is converted into four series of output pulse groups, the number of pulses in each output group corresponding with the decimal value of the digit in a corresponding order of the analog input. In the specific case assumed, the number of pulses respectively appearing on the output lines 40A–40D of converter 35 would be seven, three, five and nine.

The digital value of the output of converter 35 for each of its cycles is temporarily stored in the stages I to IV of register 25 in binary-coded decimal form, such as 1–2–4–2 code. The highest significant figure is stored in stage I of the register and the three successively lower significant figures are respectively stored in stages II to IV. When the And gates 31 are subsequently enabled by a C signal, the encoded output of register 25 is repeated in the output device 34 which may for example be a "Flexowriter" for reproducing the output in typed or punched-tape form. There is thus produced a read-out of the existing output of the transducer 23A. This phase of operation of the system of FIGS. 1A, 1B is completed when the stepping switch 11 applies a Reset signal D to clear the register 25.

The next phase of operation begins when the stepping switch 11 produces the A signal of its next cycle to step the scan switches 18A–18D to their #2 positions. For this switch position, the gain control 20 of amplifier 22 has been preset by scanner 16 to multiply the analog output of transducer 23A as amplified by amplifier 21 by the factor ⅙. Thus, for the same example above assumed, the analog input to converter 35 would be $$\frac{7.359}{6}$$

or 1.226 volts and the number of output pulses respectively applied over lines 40A–40D to stages I to IV of register 25 would be one, two, two and six.

After a time delay sufficient to permit the converter 35 to complete its cycle and for the divider analog value (1.226) to be set into stages I to IV of the register 25, the B signal is effectively applied over line 13B to shift to the right and by one decimal place the value temporarily stored in the register. Thus, as now stored in stages II to V of the register 25, the output of the transducer 23A has been in effect divided by 60 in two steps; the first by change in gain of amplifier 22 to effect division by 6; and the second by the one-step register shift to effect division by 10. The time delay between production of signal B and its effective application as a shift pulse over line 7 of the register 25 may be afforded by the delay devices 24A–24B. Specifically, the devices 24A–24B may be monostable multivibrators which are triggered from their normal state by a sharp pulse derived by differentiator 41 from the leading edge of signal B. Upon reversion to their normal state, after a period determined by their circuit parameters, the multivibrators produce output signals utilized to shift the register contents by one decimal place. To such shifted value in register 25, representing $\frac{1}{60}$ of the existing output of transducer 23A, is added the total of such previously shifted values as stored in the accumulator 28. Such addition is effected when the output gates 27 of the accumulator 28 are opened by the B signal on line 13D after a time delay introduced by the one-shot multivibrator 43 or other suitable delay device. The B signal, after further delay, introduced by the delay device 44, resets all stages of accumulator 28 to zero.

Whether such sum or new total now temporarily stored in the register 25 as an accumulator is transmitted to the read-out device 34 or is transmitted to the accumulator 28 depends upon the count registered in the counter 32. First assuming that 60 counts have been made, the output signal appearing on line 45 of the counter 32 enables the gates 31 so that the summation of the 60 counts, each representing $\frac{1}{60}$ of the transducer outputs as checked at one minute intervals, appears in binary-coded decimal form in the output device 34. In short, at hourly intervals, the average value of the output of transducer 23A for the prior hour is read out of the system. Also, upon the same assumption that 60 counts have been made, the output signal appearing on line 46 of counter 32 inhibits input gates 49 of the accumulator 28 so that the hourly average as stored in the register 25 is not transmitted or set into the accumulator 28. The 60-count average is effectively removed from the register 25 when it is cleared by the Reset signal D as transmitted over line 15. Thus, at the end of each 60-count cycle for transducer 23A, both register 25 and the accumulator 28 are at zero setting and the average value of the outputs of that transducer for the previous hour appear in the output device 34.

If, on the other hand, less than 60 counts have been registered by counter 32, the signal on its output line 45 inhibits the input gates 31 of the output device 34. However, the signal on output line 46 of counter 32 enables the And gate 47 so that the C signal, as delayed by device 48, is transmitted to enable the input gates 49 of accumulator 28. Thus, the new total temporarily stored in stages I to V of the register is transmitted to the accumulator 28. Such new total is effectively removed from register 25 when cleared by the Reset signal D from the stepping switch 11. Thus, at the end of any count which is less than 60, the output device 34 is blank, the register 25 is blank, and the sum of the count outputs of transducer 23A, as divided by 60, is stored in the acccumulator 28.

The next phase of operation of the system of FIGS. 1A, 1B begins when the stepping switch 11 produces the A signal of its next cycle to step the scan switches 18A–18D to their #3 position. For this switch position, the gain control 20 of amplifier 22 has been preset to multiply the analog output of transducer 23A as amplified by amplifier 21 by the factor $$\frac{1}{1.44}$$

Thus, for the same transducer output value above assumed, the analog input to converter 35 would be $$\frac{7.359}{1.44}$$

or 5.110 volts and the number of output pulses respectively applied over lines 40A–40D to stages I to IV of register 25 would be five, one, one and zero.

After a time delay sufficient to permit the converter 35 to complete its cycle and for the divided analog value 5.110 to be set into stages I to IV of register 25, the B signal is effectively applied over line 13C to shift to the right and by three decimal places the value originally set into the register. Thus, as new temporarily stored in stages IV to VII of register 25, the output of transducer 23A has been in effect divided by 1440 in two steps: the first by change in gain of amplifier 22 to effect division by 1.44, and the second by the three-stage register-shift to effect division by 1,000. The time delay between production of signal pulse B and its effective application as three shift pulses to register 25 may be afforded by the delay devices 26A–26D. Specifically, the devices 26A–26D may be monostable multivibrators which are triggered from their normal state by a sharp pulse derived by differentiator 49 from the leading edge of pulse B. Upon reversion to their normal state, after periods determined by their respective circuit parameters, the multivibrators produce signals utilized to shift the contents of the register 25 by three decimal places. For simplicity and clarity of explanation here, these delay devices as well as delay devices 24A–24B are shown with a single or common output line 7. Actually and as later discussed in connection with FIGS. 7 and 8 showing the register in more detail, these delay devices have a multiplicity of output lines to the various stages of the register.

To the shifted value in register 25, representing 1/1440 of the existing output of transducer 23A, is added the total of such previously shifted values as stored in the second accumulator 30. Such addition is effected when the gates 29 between accumulator 30 and register 25 are opened by the B signal on line 13E after a time delay introduced by the one-shot multivibrator 53 or other suitable delay devices. The B signal, after further delay introduced by delay device 54, resets all stages of accumulator 30 to zero.

Whether the new total or sum now temporarily stored in register 25 is transmitted to the read-out device 34 or is transmitted to the accumulator 30 depends upon the count registered in counter 33. Assuming that 1440 counts have been made, the output signal appearing on line 55 of the counter 33 enables the gates 31 so that the summation of 1440 counts, each representing 1/1440 of the output of transducer 23A, as measured at one-minute intervals, appears in binary-coded decimal form in the output device 34. Upon the same assumption that 1440 counts have been made, the output signal on line 56 of counter 33 inhibits the gate 57 so that the pulse C as transmitted over line 14C and delayed by the delay device 58 is ineffective to open the gates 59 between stages I to VII of register 25 and accumulator 30. The 1440 count average is effectively removed from the register 25 when it is cleared by the Reset signal D transmitted over line 15. Thus, at the end of the 1440 count cycle for transducer 23A, both the register 25 and the accumulator 30 are blank and the average value of that transducer for the previous twenty-four hours appears in the output device 34.

If, on the other hand, less than 1440 counts have been registered by counter 33, the signal on its output line 55 inhibits the input gates 31 of the read-out device 34. The signal on the output line 56 of the counter 33 enables the gate 57 so that the C signal, as delayed by device 58, is transmitted to enable the input gates 59 of the accumulator 30. Thus, the new total temporarily stored in stages I to VII of register 25 is transmitted to the accumulator 30. Such new total is removed from register 25 when cleared by the Reset signal D as applied to line 15. Thus, at the end of any count which is less than 1440, the output device 34 is blank, the register 25 is blank, and the sum of the counted outputs of transducer 23A as divided by 1440 is stored in the accumulator 30.

From the preceding description, it should be apparent that a record made by the output device 34 will show: (a) at one-minute intervals the then existing output of transducer 23A; (b) at hourly intervals, the average output of transducer 23A for the previous hour as well as the then existing output; and (c) at daily intervals, the average output of transducer 23A for the twenty-four hours as well as the average for the preceding hour and the then existing output.

With the electronic circuitry employed in commercial embodiments of the invention, all three phases of operation of the system of FIGS. 1A, 1B as above described are completed in a very short time; for example, all the operations performed from #1 to #3 positions of a particular transducer are completed within one second so that within the minute intervals between successive measurements on a single transducer, the same sequence of operations may be similarly performed for many transducers. In such case the system of FIGS. 1A, 1B is provided with additional pairs of counters 32, 33 and accumulators 28, 30, one pair for each additional transducer. In such system, however, the components used in common for all transducers include the pulse generator 10, stepping switch 11, scanner 16, converter 35, shifting circuits 24A–24B and 26A–26D, register 25 and read-out device 34. When different transducers have different ranges, the scanner 16 also appropriately changes the gain of amplifier 21, for purposes above stated—when the scan switch 18A (FIG. 1C) transfers from one transducer to the next.

Except in respects below specifically discussed, the system shown in FIG. 2 is similar to that of FIGS. 1A, 1B. Since the corresponding elements have been identified by the same reference characters, the preceding description of FIGS. 1A, 1B is for the most part applicable to FIG. 2 and need not be repeated.

It will be be recalled in the system of FIGS. 1A, 1B the pulse output of the convertor 35 was first introduced into stages I–IV of the register 25, was subsequently shifted either to stages II to V or to the stages IV to VII of the counter, and to such shifted count is added the content of the accumulator 28 or 30 for the #2 or #3 positions of the scan switches. As will appear from the subsequent discussion of FIGS. 7 and 8, this arrangement requires the module circuitry to be quite complex. In the system of FIG. 2, now described, the four groups of pulses forming the output of converter 35 are steered directly either to stages I to IV, to stages II to V, or to stages IV to VII depending upon whether the particular phase of operations calls for a direct read-out of the instantaneous analog value, a read-out or accumulation of the hourly average value, or a read-out or accumulation of the daily average value. For the #2 or #3 positions of the scan switches, the contents of the accumulator 28 or 30 is transferred into register 25A before it receives the output of converter 35.

Referring to FIG. 2, the four output lines 40A–40D of converter 35 are respectively connected to one of the input terminals of the And gates 66A–66D. The output terminals of gates 66A–66D are respectively connected to corresponding input terminals of stages I to IV of the register 25A. The other input terminal of each of gates 66A–66D is connected to line 13F so that all of these gates are enabled by the C signal of stepping switch 11 when the second switch 18B is in its #1 position. The previously generated B signal, after a delay introduced by the delay device 67, initiates a cycle of the converter 35. Thus, the four groups of pulses sequentially appearing on output lines 40A–40D of the converter are respectively steered into stages I to IV of the register 25A. Thus, as previously described in connection with FIGS. 1A, 1B, the binary-coded decimal value of the four significant figures of the existing analog input to the converter are temperarily stored in register 25A and are transmitted for the #1 position of scan switches 18A–18D to the read-out device 34.

The four output lines 40A–40D of converter 35 are also respectively connected to one of the input terminals of a second group of And gates 68A–68D. The output terminals of gates 68A–68D are respectively connected to corresponding input terminals of stages II to V of register 25A. The other input terminal of each of gates 68A–68D is connected to line 13B so that all of this second group of gates are enabled by the B signal when the scan switches including switch 18B are in the #2 position. Thus, the four groups of pulses respectively appearing on output lines 40A–40D of converter 35 are steered directly into stages II to V of the register 25A and consequently the value set into the register corresponds, without need for shifting, with 1/60 of the analog input to amplifier 22.

The four output lines 40A–40D of converter 35 are currents supplied to the summation point 77 through selected resistors of each of the groups of summing resistors 72A–72D, 73A–73D, 74A–74D and 75A–75D.

The switching of reference currents through resistors 72A–72D respectively is effected by switches 76A–76D, preferably of the transistor type shown in copending application Serial No. 95,714. The switches 76A–76D are respectively turned On by the signal from the associated one of the four stages I to IV of the binary counter 78. For example above given, the values of reference currents respectively supplied to the junction point 77 by resistors 72A–72D are 1,2,4,2, each times $10^{-3}$ amphere.

Starting with the first decade counter 78 set at zero, as hereinafter described, the state of each of the switches 76A–76D, the state of each of the resistors 72A–72D and the value of the total current supplied through that group of resistors to the summing junction 77 for up to the maximum of nine input pulses to counter 78 are shown by Table I below.

TABLE I

| Pulses | Switches | | | | Resistors | | | | Total Current Units×$10^{-3}$ |
|---|---|---|---|---|---|---|---|---|---|
| | 76A | 76B | 76C | 76D | 72A | 72B | 72C | 72D | |
| 0 | OFF | OFF | OFF | OFF | OFF | OFF | OFF | OFF | 0 |
| 1 | ON | OFF | OFF | OFF | ON | OFF | OFF | OFF | 1 |
| 2 | OFF | ON | OFF | OFF | OFF | ON | OFF | OFF | 2 |
| 3 | ON | ON | OFF | OFF | ON | ON | OFF | OFF | 3 |
| 4 | OFF | OFF | ON | OFF | OFF | OFF | ON | OFF | 4 |
| 5 | ON | OFF | ON | OFF | ON | OFF | ON | OFF | 5 |
| 6 | OFF | OFF | ON | ON | OFF | OFF | ON | ON | 6 |
| 7 | ON | OFF | ON | ON | ON | OFF | ON | ON | 7 |
| 8 | OFF | ON | ON | ON | OFF | ON | ON | ON | 8 |
| 9 | ON | ON | ON | ON | ON | ON | ON | ON | 9 |

also respectively connected to one of the input terminals of a third group of And gates 69A–69D. The output terminals of gates 69A–69D are respectively connected to corresponding input terminals of stages IV to VII of register 25A. The other input terminal of each of gates 69A–69D is connected to line 13C so that all of this third group of gates are enabled by the B signal when the scan switches including switch 18B is in the #3 position. Thus, the four groups of pulses respectively appearing on output lines 40A–40D of the converter are steered directly to stages IV to VII of register 25A. Consequently the value set into the register 25A corresponds, without need for shifting, with 1/1440 of the analog input to amplifier 22.

Thus, with the system of FIG. 2 as with the system of FIGS. 1A, 1B, the record made by the output device 34 will show at one-minute intervals the then existing output of transducer 23A; at hourly intervals the average output of transducer 23A as well as its then existing output; and at daily intervals the average output of transducer 23A for the previous twenty-four hours as well as the average for the preceding hour and the then existing output.

Figure 3:
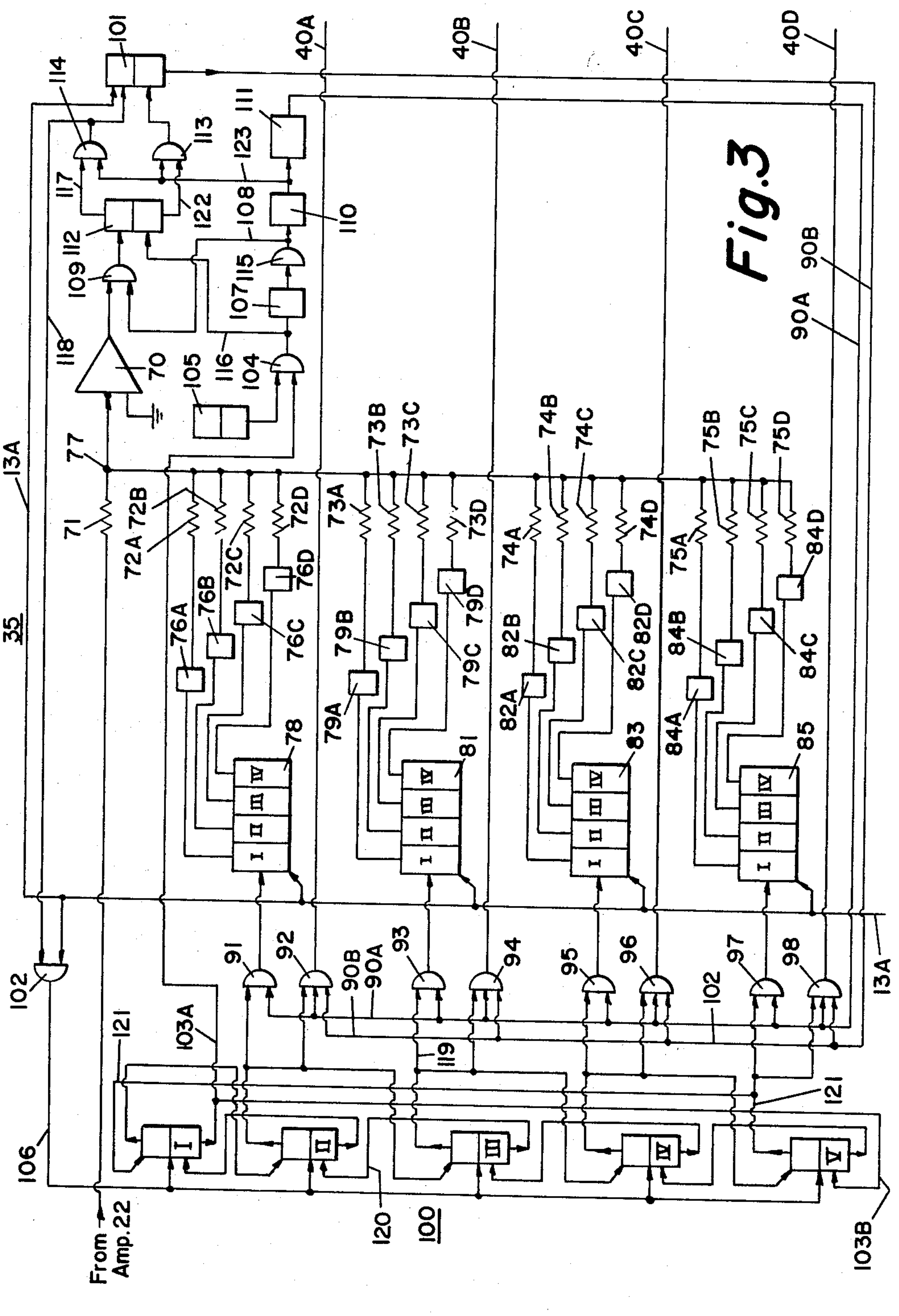
FIG. 3 shows the internal circuitry of an analog-to-digital converter included in the systems of FIGS. 1A, 1B and FIG. 2.

The circuitry of an analog-to-digital converter 35 suited for use in the systems of FIGS. 1A, 1B and 2 is schematically shown in FIG.3. This ciruitry is per se claimed in copending application Serial No. 74,523, filed December 8, 1960. The analog output current of amplifier 22 is impressed within the converter upon the input circuit of a comparison-amplifier 70 through a standard resistance 71. For purpose of explanation, it may be assumed that the maximum current traversing resistor 71 is nearly 10 milliamperes and that resistor 71 is 1,000 ohms. The unknown current through resistor 71 is eventually automatically balanced by the summation of reference For the example above given, the values of the reference currents respectively supplied to the summing junction 77 through resistors 73A–73D are 1, 2, 4, 2, each times $10^{-4}$ ampere. The switches 79A–79D for turning on the current for the associated resistors 73A–73D are respectively controlled by a signal from an associated one of the four stages I to IV of the counter 81. With the counter 81 set at zero, the state of each of the switches 79A–79C, the state of each of the resistors 73A–73D and the total current supplied by that group of resistors to the summing junction 77 incrementally changes in accordance with a table similar to Table I except for change in the table headings of the reference characters indentifying the switches and resistors and except that the multiplier for the digits of the last column is $10^{-4}$ instead of $10^{-3}$ amperes.

The reference currents supplied to the summation point 77 through the other two groups of resistors 74A–74D and 75A–75D are similarly controlled by the switches 82A–82D associated with counter 83 and by switches 84A–84D associated with counter 85. The input pulses to counter 83 progressively change the total output current of the group of resistors 74A–74D by increments of $1\times10^{-5}$ amperes from zero to a possible maximum of $10\times10^{-5}$ amperes and the input pulses to counter 85 progressively change the total output current of the group of resistors 75A–75D by increments of $1\times10^{-6}$ amperes from zero to a possible maximum of $9\times10^{-6}$ amperes.

Thus, by selective operation of the switches of each of the four groups of switches (76A–76D; 79A–79D; 82A–82D; 84A–84D), the total balancing current supplied to the summation point 77 in opposition to the unknown analog current may be set anywhere in the range from zero to 9.999 milliamperes to match the unknown analog current within $1\times10^{-6}$ amperes.

For purposes of explanation, it is now assumed that the analog input current through the standard resistor 71 is 3.596 ma. and is to be converted to four groups of pulses with three puses appearing on output line 40A of the decade counter 78, five pulses appearing on output line 40B of decade counter 81, nine pulses appearing on output line 40C of decade counter 83 and six pulses appearing on output line 40D of decade counter 85. Starting with the counter 78 set at zero and all of the counters 81,83,85 set at 9, the total current supplied to the junction point 77 for the four groups of resistors is 0.999 ma. Counting pulses, as supplied over line 90A and through the then enabled gate 91, advance the counter 78 step-by-step, per Table I, until for the third pulse the total current for the first group of summing resistors 72A–72D is 3.000 ma. Thus, the total current for all four groups of resistors is 3.999 ma. which exceeds the opposing analog current (3.596 ma.) and so effects a reversal of the output of the comparator-amplifier 70. Until such reversal, the counting pulses passed through gate 91 to the counter 78 are also passed by the gate 92 to the output line 40A of the converter. The number of pulses supplied over line 40A to the registor 25 of FIG. 1B or registor 25A of FIG. 2 thus corresponds with the highest significant digit of the unknown analog input current to converter 35.

Upon such reversal of the comparator-amplifier output, the And gates 91 and 92 are inhibited and the second counter 81 is set to zero. Thus, the next count for determining the next highest significant digit of the unknown analog current starts with the total current supplied through the four groups of summing resistors at the value of 3.099 milliamperes for which the output of comparator-amplifier 70 reverts to its original state or sign of unbalance. When five successive counting pulses on line 90A have been passed by the now enabled gate 93 to decade counter 81, the total current passed by the second group of summing resistors 73A–73D has been stepped to 0.5000 ma. Thus, the total current for all four groups of summing resistors is now 3.599 ma. which again exceeds the unknown analog current (3.596 ma.) and so effects a second reversal of the output of comparator-amplifier 70. Since the gate 94 is enabled during this second counting interval, the five counting pulses passed by the gate 93 to the counter 81 are also passed by gate 94 to appear on the output line 40B. Thus, the number of pulses supplied over output line 40B of the second decade counter 81 to the register 25 (FIG. 1B) or register 25A (FIG. 2) corresponds with the next highest significant digit of the unknown analog input current to converter 35.

Upon such second reversal of the output of amplifier 70, the gates 93, 94 are inhibited and the third decade counter 83 is set to zero. Thus, the next count starts with the total current supplied through the four groups of summing resistors at the value of 3.509 milliamperes for which the output of amplifier 70 reverts to its original sign of unbalance. When nine counting pulses sequentially applied to line 90A have been passed by the now enabled gate 95 to counter 83, the total current passed by the third group of resistors 74A–74D has been stepped to 0.090 ma. Thus, the total current passed to the summing junction 77 is now 3.599 ma. which again exceeds the unknown analog current (3.596 ma.) and so effects a third reversal of the output of the comparator-amplifier 70. Since the gate 96 is enabled during this third counting interval, the nine counting pulses passed by gate 95 to the counter 83 are also passed by gate 96 to appear on the output line 40C of the third decade counter 83. Thus, the number of pulses supplied over output line 40C to the register 25 (FIG. 1B) or register 25A (FIG. 2) corresponds with the third highest digit of the value of the unknown input current to converter 35.

Upon such third reversal of the output amplifier 70, the gates 95, 96 are inhibited and the fourth decade counter 85 is set to zero. Thus, the count of the fourth decade starts with the total current supplied through the four groups of summing resistors at the value of 3.590 ma. for which the output of amplifier 70 reverts to its original sign of unbalance. When six counting pulses sequentially applied to line 90A have been passed by the now enabled gate 97 to counter 85, the total current passed by the fourth group of summing resistors 75A–75D has been stepped to 0.006 ma. Thus, the total current passed to the summing junction 77 is now 3.596 ma. which matches the unknown analog input current to four significant digits. The amplifier 70 has itself a small input bias so that when such matching is obtained, the amplifier output reverses to disable the gates 97, 98 and so prevents any further pulses on line 90A from being applied to counter 85 or to the output line 40D. Since the gate 98 has remained enabled during this fourth counting interval, the six counting pulses passed by gate 97 to counter 85 have also been passed by gate 98 to appear on the output line 40D. Thus, the number of pulses supplied over output line 40D of the fourth decade counter 85 to the register 25 or 25A corresponds with the fourth highest digit of the unknown value of the analog input current to converter 35.

In brief, by the end of a complete cycle of the converter 35, its four decade counters 78, 81, 83, 85 have in effect converted the analog input to the converter into four sequentially-produced groups of output pulses with the number of pulses on the successive groups respectively corresponding, in descending order and as appearing on output line 40A–40D, with the first four significant digits of the analog input.

There is now described how the gates 91 to 98 and the counters 78, 81, 83 and 85 of converter 35 are conditioned by the Start pulse supplied by the stepping switch 11 of FIG. 1A or FIG. 2 to line 13A of the converter and are conditioned by the five-stage ring counter 100 to effect the four counting cycles above described. Prior to initiation of a cycle of the converter, the stages of the counter 100 have been set to their initial states for which the first stage is On and the other four stages are Off. The application of the ADC Start pulse B to the line 13A of the converter performs at least two operations. The first is to set all of the counters 78, 81, 83 and 85 to 9. The second is that the pulse as passed by the Or gate 102 to the line 106 which, as in manner later described, turns Stage II of the ring counter to On and Stage I of the ring counter to Off. The Start pulse B as applied over line 13A also turns the flip-flop 101 to the On state if not already in that state. With the first stage of the ring counter turned Off, the output of that stage as appearing on line 103A enables the gate 104 so that the clock pulses produced by the generator 105 are passed to the line 90. The initial pulse passed by the gate 104, after a delay introduced by the delay devices 107, 110 and 111 and as inverted by inverter 115 is transmitted by line 90A to the And gate 91 which has been enabled by the turning On of the second stage of the ring counter. This initial pulse changes the setting of the counter 78 from 9 to 0. At that time, because of the state of the flip-flop 101, the converter-output gate 92 is inhibited by the level on line 90B. Thus, this initial or zero count pulse does not appear as a count on the output line 40A. With the counter 78 so reset, the total summing current supplied to the jnction 77 is less than the assumed analog input to the comparator-amplifier 70. The first count pulse, after a delay introduced by the delay device 107 and as inverted by inverter 115 is also applied over line 108 to the gate 109. Thus, the amplifier output is passed to reverse the state of the flip-flop 112. The resulting output of flip-flop 112 on line 117 enables the And gate 114 so that the first count pulse is effective to reverse the state of the flip-flop 101. The resulting output on line 90B now provides another enabling level for the output gate 92. Thus, the first count pulse, as further delayed by the delay devices 110, 111 and as appearing on line 90A, now serves as a counting pulse supplied through gate 91 to the counter 78 and as an output pulse as passed by gate 92 to the line 40A. The following counting pulses are similarly applied over line 90A to the gates 91 and 92 until, as previously described, the output of the comparator 70 reverses in sign.

Such reversal of the comparator upon completion of the count for the first decade counter 78 changes the output of gate 109 to turn Off the flip-flop 112 so to enable the gate 114. The next pulse, which is the zero-count pulse, is applied over line 123 to the now enabled gate 114. The resulting output of gate 114 is applied to line 118 and thence through the Or gate 102 to the line 106. This initial or zero-count pulse as applied to the III stage of ring counter 100 produces on line 119 an output which enables input gate 93 of the second decade counter 81 and produces on line 120 an output which turns Off the II stage of the ring counter 100. Again, as previously described, the output of amplifier 70 reverses in sign so that the first count pulse is effective to reverse the flip-flop 101 so that its output on line 90B provides a second enabling input of And gate 94. This first count pulse is also effective, as later appearing on line 90A, to pass through gate 93 to step the counter 81 from zero and also to pass through output gate 94 to appear on output line 40B of the second decade counter 81. The subsequent counting pulses are similarly applied over line 90A to the gates 93, 94 until, as previously described, the output of comparator-amplifier 70 again reverses in sign.

The same sequence of events occurs for the counting by the next two decade counters 83, 85. Upon reversal of the amplifier output resulting from the last count pulse to counter 85, the switching pulse appearing on line 118 and passed by gate 102 to line 106 is effective, as now described, to result in a sequence ending with stage I of the ring counter 100 in the On state and stage V in the Off state. In this case, as well as for the other reversals of amplifier output, the switching pulse appearing on line 106 is applied to all stages of the ring counter but only that stage which at that time follows an On stage is switched On and that stage in turn switches Off the preceding stage. For example, during the period for which counter 85 is functioning, the V stage of the ring counter 100 is On and its output appearing on line 121 conditions the I stage of the ring counter so that when the amplifier reverses for the last count, the switching pulse appearing on line 106 is effective to turn the I stage of the ring counter On. The resulting output of stage I of the ring counter as appearing on line 103B is effective to turn Off stage V of the ring counter. This same output as appearing on line 103A inhibits the gate 104 to terminate the passage of clock pulses from the pulse generator 105 to the line 90A. This ends one cycle of operation of the analog-to-digital converter 35.

In the preceding discussion, no mention has been made of the output line 116 from gate 104 to the flip-flop 112 or to the gate 113 between the flip-flops 101, 112. A pulse on line 116 presets the flip-flop 112 to its reversed state and the resulting output on line 122 enables the gate 113 so that the same pulse, as delayed by device 110, is passed by the gate 113 to the flip-flop 101. The resulting output on line 90B inhibits the output gates 92, 94, 96 and 98 for all pulses except the counting pulses for each decade. The number of such counting pulses for each decade, as should be apparent from the preceding discussion, may vary from one to nine as required to effect a reversal of output of the amplifier 70. The presetting of the ifip-flop 112 by a pulse on line 116 is to a state confirmed by the subsequent application of the same pulse to gate 109 when the total of the summing currents has not exceeded the unknown analog current. The outputs on lines 117, 122 from the flip-flop 112 are complementary so that as applied through gates 114, 113 respectively to the opposite sides of the flip-flop 101, they reproduce in flip-flop 101 the same state as flip-flop 112 yet provide for time displacement of the signals respectively appearing on lines 118 and 90B.

FIG. 4 shows a typical one of the stages of the register 25A of FIG. 2. Each of the four modules W, X, Y, Z of each stage, in detail shown in FIG. 5, is a bistable multivibrator or flip-flop circuit which, for purposes of explanation, is to be considered On when a binary 1 is stored in the left-hand side and a binary 0 is stored in the right-hand side. Each stage also includes a counter-advance module T shown in FIG. 6. The state of each of the four modules of each stage for from one to nine counts is shown in Table II below:

TABLE II

*Modules*

| Pulses | W "1" | X "2" | Y "4" | Z "2" | T |
|---|---|---|---|---|---|
| 1 | ON | OFF | OFF | OFF | OFF |
| 2 | OFF | ON | OFF | OFF | OFF |
| 3 | ON | ON | OFF | OFF | OFF |
| 4 | OFF | OFF | ON | OFF | OFF<br>ON |
| 5 | ON | ON | OFF | ON | ——<br>OFF |
| 6 | OFF | OFF | ON | ON | OFF |
| 7 | ON | OFF | ON | ON | OFF |
| 8 | OFF | ON | ON | ON | OFF |
| 9 | ON | ON | ON | ON | OFF |
| Reset | OFF | OFF | OFF | OFF | OFF |

As indicated by the last or lowest row of Table II, the reset pulse D as applied by lines 15 to modules W, X, Y, Z of all stages insures that all of them are turned Off before the converter 35 begins its cycle. If during a cycle of converter 35 no pulse is applied to any particular one of the regsiter stages from the corresponding output line of the converter, all of the modules W, X, Y, Z of that stage remain Off so that the binary-coded decimal set into that stage and represented by the state of the output lines 125–128 is zero.

If and when a first pulse is applied to the W module of a register stage from a corresponding one of the output lines 40A–40D of the converter, the W module is turned On (first row of Table II) so that its output on line 125 of the stage corresponds with the binary-coded decimal value of 1.

If and when a second pulse is applied to the W module of the stage, the W module is turned Off and its output appearing on line 129 is effective to turn On the X module (second row of Table II). The output of module X as appearing on output line 126 of the stage corresponds with the binary-coded decimal value of 2.

If and when a third pulse is applied to the W module of the register stage, it is again turned On. Since the X module remains On (third row of Table II), the outputs on lines 125, 126 of the stage correspond with the binary-coded decimal value of 3.

If and when a fourth pulse is applied to the W module, it is again turned Off and the output of its line 129 turns Off the X module. The resulting output of the X module as appearing on line 130 turns On the Y module whose output as now appearing on output line 127 of the stage corresponds with the binary-coded value of 4.

At this point in the counting, the outputs of the Y and Z modules as appearing on lines 132, 133 of the counter-advance module condition it for being turned On if and when a fifth input pulse is applied to the W module.

If and when a fifth pulse is applied to the W module, it is again turned On and its output appearing on line 131 to module T effects a series of events now described. The output of module T appearing on line 134 turns On the X module and the output of module T appearing on line 135 turns Off the Y module. The resulting output of the Y module as appearing on line 136 turns On the Z module. The T module is inactive for any subsequent pulses in the count. Thus, and as shown in the fifth row of Table II, the application of the fifth pulse, combined with the action of the counter-advance module T, results in the W, X and Z modules being set to the On state. Their outputs as appearing on lines 125, 126 and 128 correspond with the binary-coded decimal value of 5 for the stage.

From the preceding description and Table II, it should be apparent that for application of any further input pulses, up to 9, to the register stage from the corresponding output line of converter 35, there is correspondence between the number of input pulses and the binary-coded decimal value represented by the outputs of the W, X, Y, Z modules of the stage as appearing on the output lines 125 to 128.

Although all output stages of the register 25A are set to zero by reset pulse D after converter 35 has completed a cycle for the #2 and #3 positions of the scan switches 17A–17D, the transmission into the register of the contents of the accumulator 28 or 30 before any pulse is received from the converter 35 in effect advances each stage of the register to the binary-coded decimal value stored in the corresponding stage of the accumulator. The output pulses subsequently received from converter 35 then further advance the count in the register stage in accordance with Table II up to the maximum count 9. The interstage carry lines 137 become involved when the digital value transferred to a stage from the accumulator plus the number of pulses subsequently received from the converter exceed the value 9. Assuming, for example, that a particular stage has been advanced to the output value 6 by a transfer thereto from the accumulator and that four pulses are subsequently supplied to the register from the converter for the first three of these pulses, the count proceeds from 7 to 9 as shown in Table II. For the fourth of these pulses, the output of the Z module as appearing on its output line 137 is effectively carried over to the W module of the next higher order stage as an additional count for that stage.

The basic circuitry of the counter modules of FIG. 4, per se known, is shown in FIG. 5 and now briefly described. Each counter module is fundamentally a bistable flip-flop circuit comprising a pair of transistors 141, 142 which are cross-connected by the feedback lines 143, 144 so that when either transistor is turned On, it in turn switches the other transistor Off. When a reset pulse appears on input line 15 of the module, the transistor 141 is turned Off and in turn switches the transistor 142 to On. For this state of the transistors, the line 143 is negative with respect to ground and the line 144 is essentially at ground potential. Because of the inverters 145, 147, the junction of diode 149 and capacitor 150 is essentially at ground potential and the junction of diode 151 and capacitor 152 is negative with respect to ground. Also for this state of the transistors, the junction of capacitor 150 and resistor 153 is essentially at ground potential and the junction of capacitor 152 and resistor 155 is negative with respect to ground. When a negative signal is applied to the junction of diodes 149, 151, it is effective to turn On the transistor 141 which in turn switches Off the transistor 142.

Now assuming that transistor 141 is On and transistor 142 is Off: the junction of diode 149 and capacitor 150 is negative with respect to ground; the junction of diode 151 and capacitor 152 is essentially at ground potential; the junction of capacitor 150 and resistor 153 is negative with respect to ground; and the junction of capacitor 152 and resistor 155 is essentially at ground potential. When a negative potential is now applied to the junction of the diodes 149, 151, it is effective to switch transistor 142 to On and this transistor is effective in turn to switch the transistor 141 to Off.

In brief, whenever a negative signal is applied to the junction of the diodes 149, 151, the complementary outputs of the module are reversed regardless of the states of the transistors. The network comprising the diodes 149, 151, capacitors 150, 152 and the inverters 145, 147 provide a steering circuit which directs the negative input signal to turn On whichever transistor is then Off and the switched transistor in turn switches the other transistor to On.

The sources for the negative signals above discussed depend upon the location of the module in the counter register 25A. For the W module of a particular stage, one of the input lines to the junction of diodes 149, 151 is from a corresponding one of the output lines 40A–40D of the converter and the other input line is the carry line 137 from the next lower stage. For the X, Y and Z modules, there is only one source of negative input signals, i.e., lines 129, 130, 136 respectively. For all of the modules W, X, Y, Z, there is a line 174 from the corresponding module of one or the other of the accumulators 28 or 30 for transfer of its contents into the register 25A.

The internal circuitry of a suitable counter-advance module T is shown in FIG. 6. The circuitry of module T is basically the combination of a differentiator, an And gate and an implifier. A negative signal on the input lines 132, 133, the And gate formed by the diodes 160, 161, and transistor 162 will produce an output upon application of a grounding signal on line 131. Such signal as differentiated by capacitor 163 and applied to the base of transistor 162 completes the enabling of the And gate. Before such gate is turned On, the amplifier-transistor 164 is in slightly conductive state with current flowing from the positive terminal of battery 165 through resistors 168, 167, transistor 164 and resistor 166. Current also flows from the positive terminal of battery 165 through resistor 168, diodes 169 and resistor 170 to the negative terminal of the battery. Because of the low forward-resistance of diode 169, the potential at point 171 is essentially the same as that of the junction between resistors 167, 168. Thus, the capacitor 172 is charged and has the poling indicated. When the And gate is momentarily enabled, as above described, the transistor 164 becomes highly conductive because of the forward bias derived from resistors 166, 173 and 183, and the resulting increased flow of current through resistor 167 further increases the charge of capacitor 172. Upon cessation of the differentiated pulse, the transistor 162 reverts to the conductive state, disabling the And gate whereupon transistor 164 reverts to its slightly conductive state. Upon such reversion, the potential of point 171 is more positive than the potential of the junction between resistors 167, 168 so that there is no current conduction through diode 169. Consequently, the discharge of capacitor 172 produces a positive output pulse on the lines 134, 135.

One stage of the shift counter register 25 of FIG. 1B is shown in FIG. 7. It is similar to the counter stage shown in FIG. 4 but each of its W, X, Y, Z modules, as shown in detail in FIG. 8, has two additional input shift-steering lines 175, two additional output shift steering lines 176 and a shift pulse line 27 (FIG. 1B) comprising lines 27A, 27B, 27C. For counting, the negative count-enabling signal appears on line 27C to enable the gates 177, 178, 145A and 147A. For shifting, a negative shift-enabled signal appears on line 27A to enable gates 179, 180, 181 and the shift pulse subsequently appearing on line 27B is passed by gate 179 and inverted by inverter 791 and applied to the junction of diodes 149, 151. The shift pulse is steered by gates 180, 181 to transfer into the module the binary contents of the corresponding module of the next higher order stage of the register and simultaneously to transfer out of the module, by the complementary steering line 175, 176, its binary contents of the corresponding module of the next lower order stage. For transfer into the module, after the counting and shifting, of the binary content stored in a corresponding module of the accumulator 28 or 30, there is provided a pair of gates 29A, 29B and a differentiator circuit including diode 184 and capacitor 185. With one of the other of gates 29A, 29B enabled by the complementary outputs of the accumulator module and a B signal on line 13E, the differentiation of the B signal by capacitor 185 produces a transfer shift pulse applied to the junction of diodes 149, 151. This produces in the register module a reproduction of the binary content of the accumulator module.

The counter-advance module TA used in the shift-counter register stage of FIG. 7 may be the same as that shown in FIG. 6 including the input line 27C to which is applied an inhibit signal precluding advance of the count in the stage when the shift-steering lines 175, 176 are enabled. This module as used in the count stage of FIG. 1 and in the register 25A of FIG. 2 need not include this input line 27C.

There is now discussed another mode of operating the systems of FIGS. 1A, 1B and FIG. 2 to read out the average of the outputs of a plurality of transducers in rapid succession applied to the amplifier means 21, 22. With the scan switches 18A–18D set in their #2 position, for example, the switch 188 is thrown to its dotted line position (FIG. 1A) so that the A pulse output of the stepping switch 11 is applied to the scanner 16A to step the scan switch 189 for each cycle of the stepping switch. The switch 187 is thrown to its dotted line position so that the Reset pulses D of the stepping switch 11 are not applied to the register 25 of FIG. 1A or the register 25A of FIG. 2.

Assuming the switch 189 has twelve contacts respectively connected to a corresponding number of transducers 23A et seq., the gain of the scaling amplifier 22 is set to effect division by the factor $$\frac{1}{1.2}$$

For each twelve successive cycles of the switch 11, the outputs of the twelve transducers 23A et seq. are in succession applied to amplifier 16. For each of these twelve cycles, the converter 35 is started by the B pulse of the steping switch 11 as above described, and the output of the connected transducer is set into the register 25 or 25A with a displacement corresponding with a division by the factor 10. As the coded output of each transducer is in turn entered into the register, it is there added to the accumulation therein of the previous outputs of the series.

With the counter 32 preset for twelve counts, the application of the twelfth B pulse over its input line 14B produces on line 45 an output which enables the gates 31 so that the summation of the twelve twice-divided outputs of the transducer as appearing in stages I to IV of the register are transferred to the output device 34 as a binary-coded signal representing the average of the outputs of the transducers scanned by switch 189. The output of counter 32 after a delay introduced by delay device 190 is applied through switch 187 as a Reset pulse which clears the register.

For this mode of operation, the transfer of the contents of the register to accumulator 28 is avoided by preventing the B pulses from enabling the gates 49. This may be accomplished by opening the switch 191 in output line 46 of counter 32.

Although the invention has been described in connection with preferred forms thereof, it will be understood that it comprehends modifications within the scope of the appended claims.

What is claimed is:

1. A system for producing a binary-coded digital output representing the average of a predetermined number of successive analog values comprising summation means including counter means having normal-digit-position stages and at least one stage of lower order, means for dividing the successive analog values each by a first factor related to said predetermined number thereof, converter means for transforming each analog value as divided by said first factor into a binary-coded signal consisting of groups of pulses, the number of pulse groups corresponding with said sumber of normal-digit-positions of said counter means, and the number of pulses in each group respectively corresponding with the numerical value of a corresponding one of the significant digits of said analog value, means for entering each of said binary-coded signals in said counter means with displacement from its normal digit position in direction and extent corresponding with division by a second factor, the product of said first and second factors corresponding with said predetermined number of analog values, accumulator means having a number of stages exceeding the number of normal-digit-position stages of said counter means, the number of stages in excess being related to the second factor, a first gating means for transferring the twice-divided digital value of successive binary-coded signals from and back to the counter means via the accumulator means for addition to the accumulated digital value of previously similarly transferred binary-coded signals, read-out means, and a second gating means between said read-out means and said counter means effective upon entry in said counter means of said predetermined number of binary-coded signals from the converter means for transfer to the read-out means from the normal-digit-position stages of the counter of a binary-coded signal corresponding with the average of said predetermined number of analog values.

2. A system as in claim 1 in which the means for dividing the analog values by the first factor comprises an amplifier with binary-coded feedback resistors for presetting the amplifier gain in dependence upon the number of the successive analog values to be averaged.

3. A system as in claim 1 in which the counter means is a shift counter, in which the binary-coded signals are initially entered in said normal-digit-position stages of the shift-counter means, and in which their said displacement is effected by means producing and applying to the shift-counter shift pulses in number corresponding with said second dividing factor.

4. A system as in claim 1 in which said displacement of the binary-coded signals is effected by gating means which steer said binary-coded signals from the converter means into those stages of the counter means corresponding with division by said second factor.

5. A system as in claim 1 in which each stage of the counter means comprises four counter modules having binary-coded decimal outputs, and a counter-advance module, said counter-advance module comprising an amplifier, a differentiator, and three And gate elements, two of said And gate elements being energized by outputs of two of said counter modules and the third of said And gate elements being energized by an output of another of said modules as differentiated by said differentiator, the concurrent energization of all three of said And gate elements producing a delayed pulse on an output line of said amplifier to affect the state of certain of said counter-modules to provide an advance in the value of the joint output of all of said counter stages in steps of 1 from 0 to 9 for successive pulses of one of said groups of pulses.

6. A system as in claim 1 including a second accumulator means having a number of stages exceeding the number of normal-digit-position stages of said counter means, the number of stages in excess being related to a different second factor, and a third gating means for transferring a twice-divided digital value of successive binary-coded signals from and back to the counter means via the second accumulator means for addition to the accumulated digital value of previously similarly transferred binary-coded signals, said second gating means between the read-out means and said counter means being effective after entry in said counter means of a second predetermined number of binary-coded signals from the converter means for transfer to the read-out means from the normal-digit position stages of the counter of a binary-coded signal corresponding with the average of the second predetermined number of analog values.

7. A system for producing a binary-coded digital output representing the average of a predetermined number of successive analog values comprising summation means including counter means having normal-digit-position stages and at least one stage of lower order, means for dividing the successive values each by a first factor related to said predetermined number thereof, converter means for transforming the divided analog values into a succession of binary-coded signals, each consisting of groups of pulses, the number of pulse groups corresponding with the number of said normal-digit-position stages of said counter means, and the number of pulses in each group being from 0 to 9 depending upon the numerical value of a corresponding one of the digits of the analog input of the converter means, means for entering each of said binary-coded signals in said counter means with displacement from its normal-digit-position in direction and extent corresponding with division by a second factor, the product of said first and second factors corresponding with said predetermined number of analog values, said counter means comprising four counter modules having binary-coded decimal outputs, and a counter-advance module, said counter-advance module comprising an amplifier a differentiator, and three And-gate elements, two of said And-gate elements being energized by the outputs of two of said counter modules and a third of said And-gate elements being energized by the output of another of said modules as differentiated by said differentiator, the concurrent energization of all three of said And-gate elements enabling the And-gate and resulting in a delayed pulse on an output line of said amplifier to effect the state of certain of said counter modules to provide an advance in the value of the joint output of all of said counter stages in steps of 1 from 0 to 9 for successive pulses of one of said groups of pulses, said delayed pulse being derived from a network including a rectifier, a capacitor, resistance means traversed by the output current of said capacitor for charging of said capacitor through said rectifier, and a circuit maintaining conduction of said rectifier except upon sudden decrease in output of said amplifier occurring when said And-gate is disabled, the output line of the amplifier being connected to the junction of said capacitor and said rectifier means, said rectifier means becoming non-conductive upon said sudden decrease of output current of said amplifier whereupon the discharge of said capacitor produces a pulse on said output line.

References Cited by the Examiner

UNITED STATES PATENTS 2,775,754 12/56 Sink ---------------- 340—347

MALCOLM A. MORRISON, *Primary Examiner.*

LLOYD W. MASSEY, *Examiner.*